(12) United States Patent
Xiong et al.

(10) Patent No.: US 10,390,354 B2
(45) Date of Patent: Aug. 20, 2019

(54) EVOLVED NODE-B (ENB), USER EQUIPMENT (UE) AND METHODS FOR FLEXIBLE DUPLEX COMMUNICATION

(71) Applicant: Intel IP Corporation, Santa Clara, CA (US)

(72) Inventors: Gang Xiong, Beaverton, OR (US); Hong He, Beijing (CN); Ralf Matthias Bendlin, Portland, OR (US); Jong-Kae Fwu, Sunnyvale, CA (US); Seunghee Han, San Jose, CA (US); Huaning Niu, Milpitas, CA (US); Yushu Zhang, Beijing (CN); Yuan Zhu, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/756,210

(22) PCT Filed: Dec. 11, 2015

(86) PCT No.: PCT/US2015/065284
§ 371 (c)(1),
(2) Date: Feb. 28, 2018

(87) PCT Pub. No.: WO2017/044141
PCT Pub. Date: Mar. 16, 2017

(65) Prior Publication Data
US 2018/0359762 A1    Dec. 13, 2018

Related U.S. Application Data

(60) Provisional application No. 62/216,917, filed on Sep. 10, 2015.

(51) Int. Cl.
*H04W 72/08*    (2009.01)
*H04B 7/26*    (2006.01)
(Continued)

(52) U.S. Cl.
CPC ........ *H04W 72/085* (2013.01); *H04B 7/2656* (2013.01); *H04L 5/14* (2013.01);
(Continued)

(58) Field of Classification Search
None
See application file for complete search history.

(56) References Cited

U.S. PATENT DOCUMENTS

2013/0250822 A1    9/2013    Yang et al.
2013/0343313 A1*  12/2013    Takeda .................... H04L 5/001
                                                          370/329
(Continued)

FOREIGN PATENT DOCUMENTS

TW    201711417 A    3/2017

OTHER PUBLICATIONS

"International Application Serial No. PCT/US2015/065284, International Preliminary Report on Patentability dated Jun. 29, 2016", 9 pgs.

(Continued)

*Primary Examiner* — Anh Ngoc M Nguyen
(74) *Attorney, Agent, or Firm* — Schwegman Lundberg & Woessner, P.A.

(57) ABSTRACT

Embodiments of an Evolved Node-B (eNB), User Equipment (UE), and methods for flexible duplex communication are generally described herein. The eNB may transmit a downlink control information (DCI) block to the UE during a group of time-division duplex (TDD) sub-frames. The eNB may further receive an uplink control information (UCI) block from the UE during the group of TDD sub-frames. A first candidate flexible duplex format for the TDD sub-frames may include a downlink control portion and an uplink control portion. A second candidate flexible duplex (Continued)

format for the TDD sub-frames may include a downlink control portion and may exclude uplink control portions.

29 Claims, 8 Drawing Sheets

(51) Int. Cl.
  *H04W 72/04* (2009.01)
  *H04L 5/14* (2006.01)
  *H04L 1/18* (2006.01)
  *H04L 5/00* (2006.01)

(52) U.S. Cl.
  CPC ... *H04W 72/0413* (2013.01); *H04W 72/0446* (2013.01); *H04L 1/1854* (2013.01); *H04L 5/0007* (2013.01)

(56) References Cited

U.S. PATENT DOCUMENTS

| | | |
|---|---|---|
| 2014/0161001 A1 | 6/2014 | Gao et al. |
| 2014/0241298 A1 | 8/2014 | Park et al. |
| 2015/0043400 A1 | 2/2015 | Choi et al. |
| 2015/0181588 A1 | 6/2015 | Song et al. |
| 2015/0358111 A1* | 12/2015 | Marinier ............... H04L 1/0003 370/329 |
| 2016/0013896 A1* | 1/2016 | Sun ....................... H04L 1/1854 370/280 |

OTHER PUBLICATIONS

"International Application Serial No. PCT/US2015/065284, International Search Report dated Jun. 29, 2016", 4 pgs.

"International Application Serial No. PCT/US2015/065284, Written Opinion dated Jun. 29, 2016", 7 pgs.

* cited by examiner

710

| TWO BITS | xPDCCH / xPUCCH SIZE |
|---|---|
| [0,0] | xPDCCH = 3 SYMBOLS, NO xPUCCH |
| [0,1] | xPDCCH = 2 SYMBOLS, xPUCCH = 1 SYMBOL |
| [1,0] | xPDCCH = 1 SYMBOL, xPUCCH = 2 SYMBOLS |
| [1,1] | No xPDCCH, xPUCCH = 3 SYMBOLS |

720

| TWO BITS | xPDCCH / xPUCCH SIZE |
|---|---|
| [0,0] | xPDCCH = 1 SYMBOL, WITHOUT xPUCCH |
| [0,1] | xPDCCH = 1 SYMBOL, WITH xPUCCH |
| [1,0] | xPDCCH = 2 SYMBOLS, WITHOUT xPUCCH |
| [1,1] | xPDCCH, = 2 SYMBOLS, WITH xPUCCH |

730

| TWO BITS | TYPE OF FLEXIBLE DUPLEX SUB-FRAME |
|---|---|
| [0,0] | NO xPDCCH, ONLY xPUCCH |
| [0,1] | NO xPUCCH, ONLY xPDCCH |
| [1,0] | BOTH xPDCCH AND xPUCCH |
| [1,1] | RESERVED, OR COULD INDICATE THE LENGTH OF xPDCCH AND xPUCCH TOGETHER |

*FIG. 7*

EVOLVED NODE-B (ENB), USER EQUIPMENT (UE) AND METHODS FOR FLEXIBLE DUPLEX COMMUNICATION

PRIORITY CLAIM

This application is a U.S. National Stage Filing under 35 U.S.C. 371 from International Application No. PCT/US2015/065284, filed Dec. 11, 2015 and published in English as WO 2017/044141 on Mar. 16, 2017, which claims priority to U. S. Provisional Patent Application Ser. No. 62/216,917, filed Sep. 10, 2015, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and fifth generation (5G) networks, although the scope of the embodiments is not limited in this respect. Some embodiments relate to flexible duplex communication. Some embodiments relate to downlink control information and uplink control information.

BACKGROUND

A mobile network may support communication with mobile devices. In some cases, exchanging of data between a base station and the mobile device may be performed with a relatively low latency. As demand for data from the network increases, it may become challenging to support such low-latency communication for the mobile device, which may affect user experience in some cases. Accordingly, there is a general need for methods and systems for communication according to reduced or low latency in these and other scenarios.

BRIEF DESCRIPTION OF THE DRAWINGS

FIG. 7 illustrates example mappings for flexible duplex formats in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
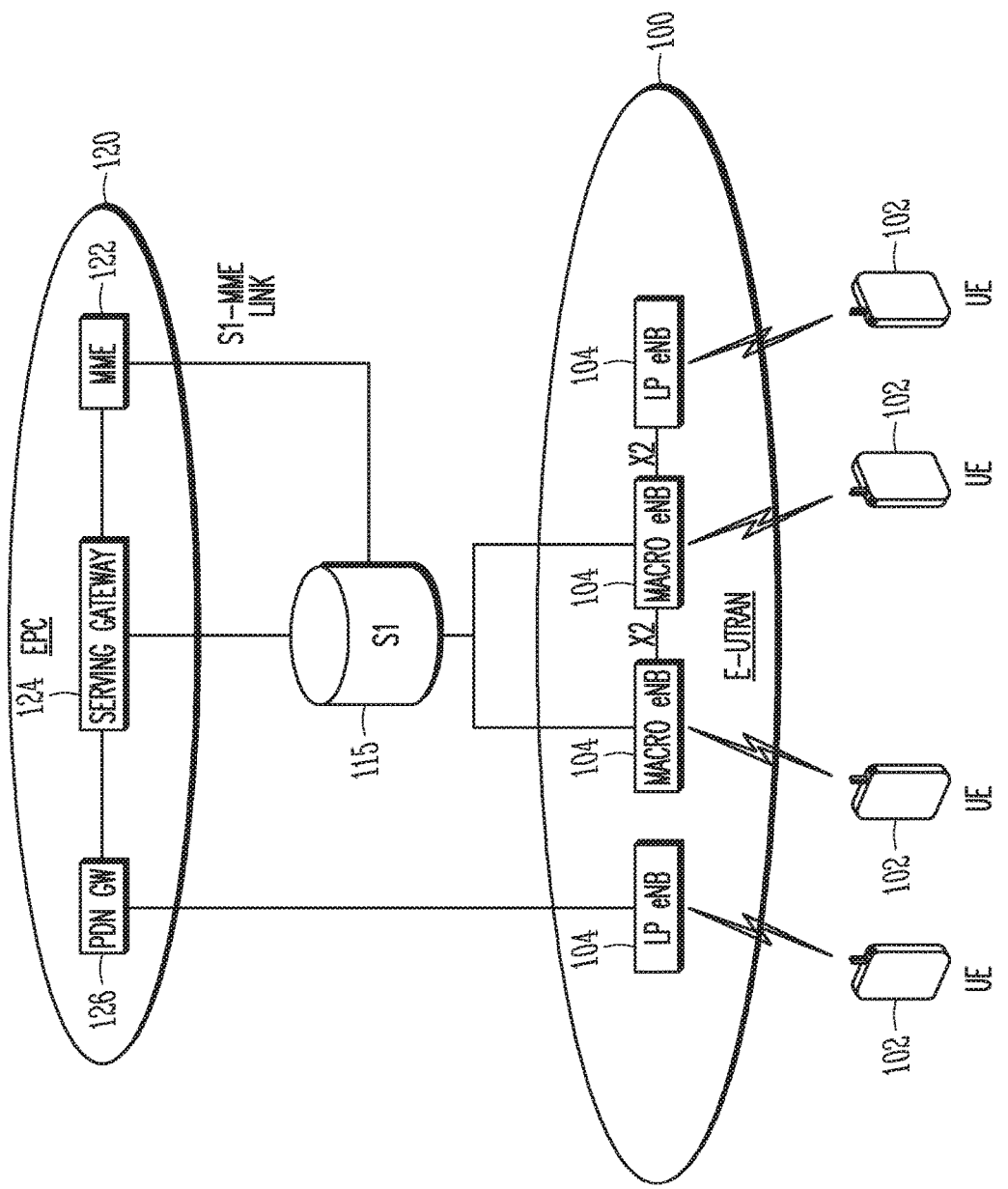
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs.

In some embodiments, the eNB 104 may transmit a downlink control information (DCI) block to the UE 102 during a group of time-division duplex (TDD) sub-frames. The eNB 104 may further receive an uplink control information (UCI) block from the UE 102 during the group of TDD sub-frames. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100 and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LIE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as ratio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency arid, called a resource grid or time-frequency resource grid, which is the physical resource in the downlink in each slot. Such a time-frequency plane representation is a common practice for OFDM systems, which makes it intuitive for ratio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
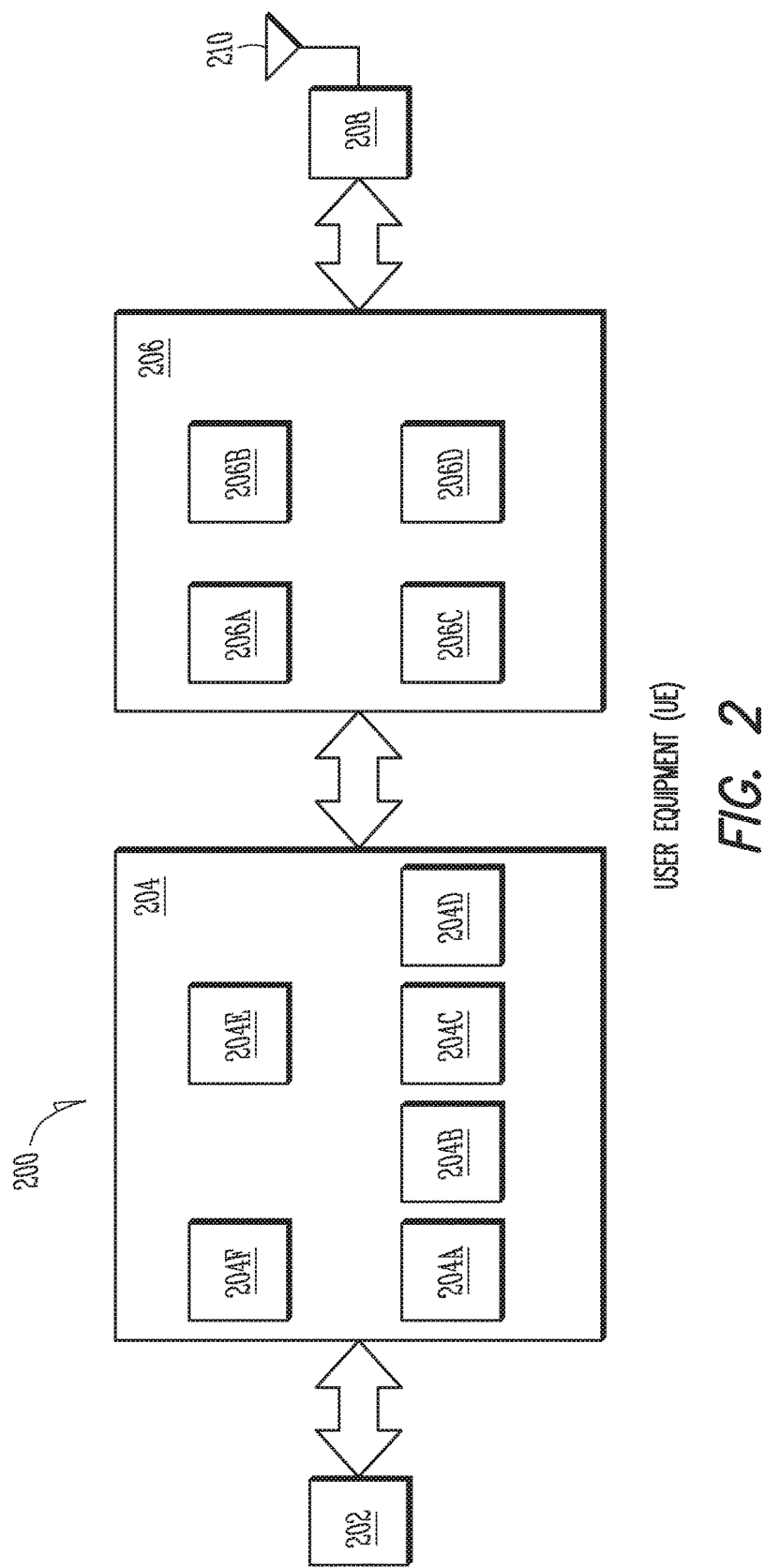
FIG. 2 is a block diagram of a user Equipment (UE) in accordance with some embodiments.

FIG. 2 is a block diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and one or more antennas 210, coupled together at least as shown. In some embodiments, other circuitry or arrangements may include one or more elements and/or components of the application circuitry 202, the baseband circuitry 204, the RF circuitry 206 and/or the FEM circuitry 208, and may also include other elements and/or components in some cases. As an example, "processing circuitry" may include one or more elements and/or components, sonic or all of which may be included in the application circuitry 202 and/or the baseband circuitry 204. As another example, "transceiver circuitry" may include one or more elements and/or components, some or all of which may be included in the RF circuitry 206 and/or the FEM circuitry 208. These examples are not limiting, however, as the processing circuitry and/or the transceiver circuitry may also include other elements and/or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved.

universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In sonic embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications or more man one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In sonic embodiments, the UE 200 may include additional elements such as, for example, memory/storage, display, camera, sensor, and/or input/output (I/O) interface.

Figure 3:
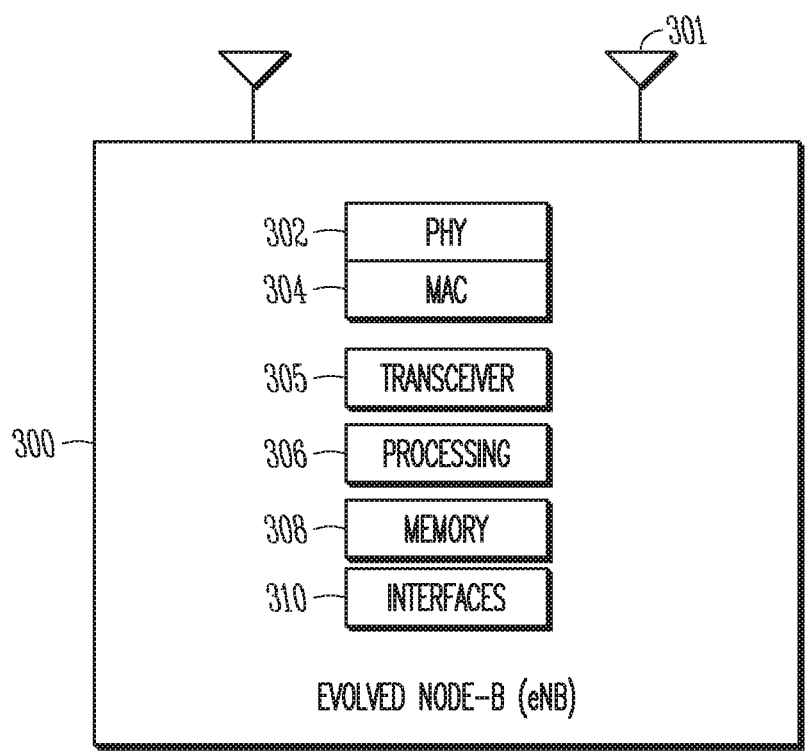
FIG. 3 is a block diagram of an Evolved Node-B (eNB) in accordance with some embodiments.

FIG. 3 is a block diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission arid reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210, 301 may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a. computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in sonic embodiments, an apparatus used by the UE 200 and/or eNB 300 may include various components of the UE 200 and/or the eNB 300 as shown in FIGS. 2-3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

In accordance with some embodiments, the eNB 104 may transmit a downlink control information (DCI) block to the UE 102 during a group of time-division duplex (TDD) sub-frames. The eNB 104 may further receive an uplink control information (UCI) block from the UE 102 during the group of TDD sub-frames. The TDD sub-frames in the group may be configured according to a group of candidate flexible duplex formats, which may include at least a first and a second candidate flexible duplex format. The first candidate flexible duplex format for the TDD sub-frames may include a downlink control portion and an uplink control portion. The second candidate flexible duplex format for the TDD sub-frames may include a downlink control portion and may exclude uplink control portions. These embodiments are described in more detail below.

Figure 4:
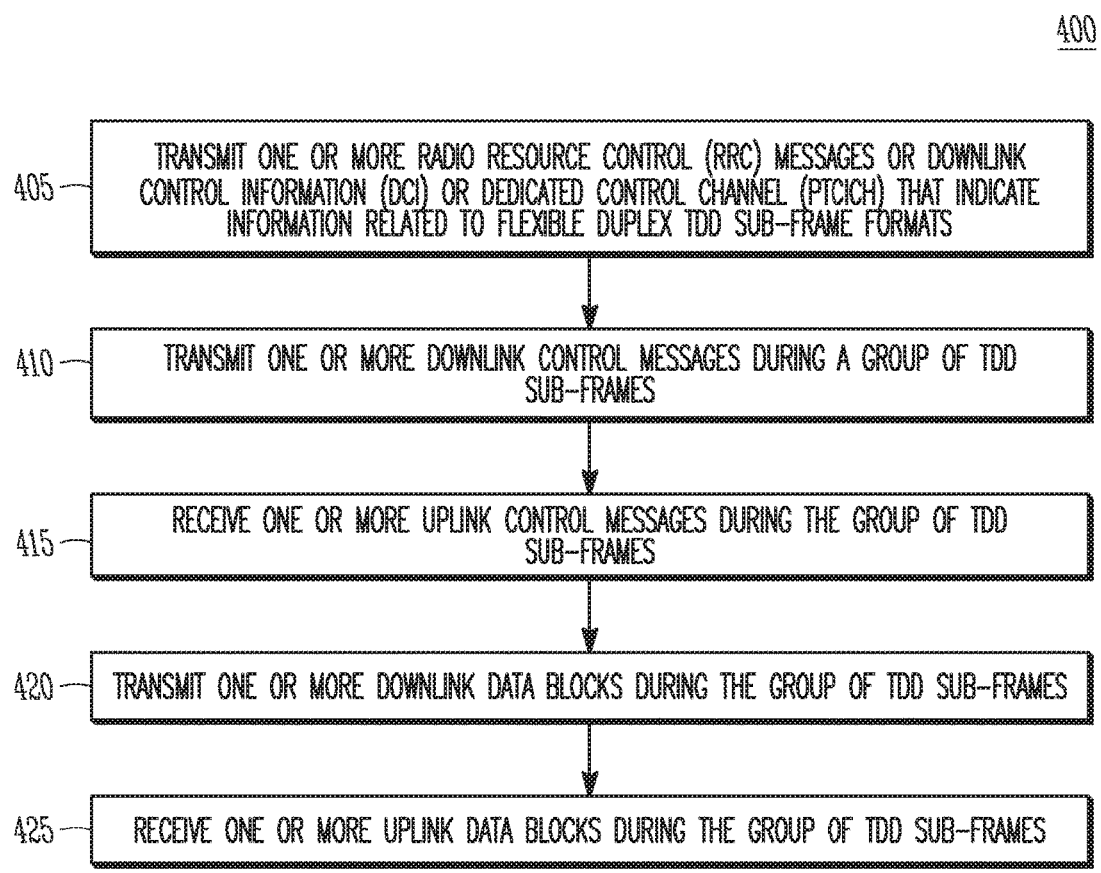
FIG. 4 illustrates the operation of a method of flexible duplex communication in accordance with some embodiments.

FIG. 4 illustrates the operation of a method of flexible duplex communication in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-7, although it is understood that the method 400 may be practiced with any other suitable systems, interfaces and components.

In addition, while the method 400 and other methods described herein may refer to eNBs 104 or UEs 102 operating in accordance with 3G-PP or other standards, embodiments of those methods are not limited to just those eNBs 104 or UEs 102 and may also be practiced on other devices, such as a Wi-Fi access point (AP) or user station (STA). In addition, the method 400 and other methods described herein may be practiced by wireless devices configured to operate in other suitable types of wireless communication systems, including systems configured to operate according to various IEEE standards such as IEEE 802.11. The method 400 may also refer to an apparatus for a UE 102 and/or eNB 104 and/or other device described above.

At operation 405 of the method 400, the eNB 104 may transmit one or more control messages to one or more UEs 102. In some embodiments, radio resource control (RRC) messages that may be included in 3GPP standards or other standards may be used. However, embodiments are not limited as such, and other suitable control messages may be used in some cases. As an example, one or more particular downlink control information (DCI) formats may be transmitted by the eNB 104. DCIs transmitted according to such DCI formats may include a portion reserved for indication of information related to flexible-duplex formats, as will be described below. As another example, a dedicated control channel, such as a physical TDD configuration indicator channel (PTCICH), may be used. The RRC messages or downlink control information (DCI) formats or dedicated control channel messages (such as the PTCICH) may include and/or indicate information related to flexible duplex formats to be used for a group of TDD sub-frames in which the eNB 104 and the UEs 102 may communicate. In some embodiments, the group of TDD sub-frames may be included in a sequence of TDD sub-frames, although the scope of embodiments is not limited in this respect. For instance, the TDD sub-frames may be non-overlapping and may be of uniform duration, in sonic cases. Although not limited as such, the TDD sub-frames may be included as part of a larger frame, such as a super-frame or radio frame or other.

The RRC messages or dedicated control channel messages or DCIs using suitable DCI formats as described previously may include any suitable information related to TDD sub-frame formatting and may include other information in some cases. As an example, the RRC messages or dedicated control channel messages or DCIs using suitable DCI formats as described previously may indicate which candidate flexible duplex formats are to be used for the TDD sub-frames in the group. As another example, the RRC messages or dedicated control channel messages or DCIs using suitable DCI formats as described previously may indicate time resources allocated for downlink control portions and/or uplink control portions of the TDD sub-frames in the group. As another example, the RRC messages or dedicated control channel messages or DCIs using suitable DCI formats as described previously may indicate frequency resources allocated for the downlink control portions and the uplink control portions of the TDD sub-frames in the group.

For instance, the frequency resources may include any number of resource elements (REs), resource blocks (RBs), sub-carriers, sub-channels and/or other unit of bandwidth. These examples are not limiting, as the RRC messages or dedicated control channel messages or DCIs using suitable DCI formats as described previously may include and/or indicate other information that may or may not be related to the flexible duplex formats.

At operation 410, one or more downlink control messages may be transmitted during the group of TDD sub-frames. At operation 415, one or more uplink control messages may be received during the group of TDD sub-frames. At operation 420, one or more downlink data blocks may be transmitted during the group of TDD sub-frames. At operation 425, one or more uplink data blocks may be received during the group of TDD sub-frames. Although not limited as such, the downlink control messages may include downlink control information (DCI) blocks in some cases. In addition, the uplink control messages may include uplink control information (UCI) blocks in some cases, although embodiments are not limited as such.

It should be noted that the TDD sub-frames in the group may be configured, in some cases, according to different flexible duplex formats. Accordingly, some or all of the TDD sub-frames in the group may not necessarily support exchanging of downlink control messages and/or uplink control messages, in some cases. In addition, some or all of the TDD sub-frames in the group may not necessarily support exchanging of downlink data blocks and/or uplink data blocks in sonic cases.

As an example, a first candidate flexible duplex format may include a downlink control portion allocated for DCI transmission by the eNB 104 and may further include an uplink control portion allocated for UCI transmission by the UEs 102. As another example, a second candidate flexible duplex format may include a downlink control portion allocated for DCI transmission by the eNB 104 and may further exclude uplink control portions allocated for UCI transmission by the UEs 102. As another example, the candidate flexible duplex formats (such as the first and second or others) may include data portions allocated for downlink data transmissions by the eNB 104 and/or uplink data transmissions by the UEs 102. As another example, a third candidate flexible duplex formats may exclude downlink control portions allocated for DCI transmission by the eNB 104 and may include an uplink control portion allocated for UCI transmission by the UEs 102.

As another example, the eNB 104 may transmit a first DCI block to a first UE 102 and may receive a UCI block from the first UE 102 during a first TDD sub-frame, which may be configured according to a first flexible duplex format that includes a downlink control portion and an uplink control portion. The eNB 104 may further transmit a second DCI block to a second UE 102 (or to the first UE 102 in some cases) during a second TDD sub-frame, which may be configured according to a second flexible duplex format that includes a downlink control portion and excludes uplink control portions. In some cases, at least one of the TDD sub-frames in the group may be configured according to the first candidate flexible duplex format and at least one of the TDD sub-frames in the group may be configured according to the second candidate flexible duplex format. That is, a mixture of formats may be used for TDD sub-frames in the group.

In some embodiments, one or more DCI blocks may be transmitted during one or more of the TDD sub-frames in the group. Accordingly, a DCI block may include and/or indicate information about the particular TDD sub-frame in which it is transmitted, in some cases. As an example, the DCI block transmitted in a particular TDD sub-frame may indicate time resources to be used for data transmissions (downlink and/or uplink) during the particular TDD sub-frame. As another example, for at least one TDD sub-frame in the group, a DCI block transmitted during the TDD sub-frame may indicate a starting time of a data portion allocated for data transmissions during the TDD sub-frame. As another example, for at least one TDD sub-frame in the group, a DCI block transmitted during the TDD sub-frame may indicate a flexible duplex format for the TDD sub-frame.

As another example, for at least one TDD sub-frame in the group, a DCI block transmitted during the TDD sub-frame may indicate whether an uplink control portion is allocated for the TDD sub-frame. As another example, for at least one TDD sub-frame in the group, a DCI block transmitted during the TDD sub-frame may indicate whether an uplink control portion is allocated for the TDD sub-frame and may further indicate a size of a downlink control portion allocated for the TDD sub-frame. As another example, for at least one of the TDD sub-frames in the group, the DCIs transmitted during the TDD sub-frame may indicate flexible duplex formats for multiple TDD sub-frames in the group.

In some embodiments, one or more UCI blocks may be transmitted by the UEs 102 and received by the eNB 104 during one or more of the TDD sub-frames in the group. As an example, for at least one TDD sub-frame in the group, a UCI block received during the TDD sub-frame may include a hybrid automatic repeat request (H-ARQ) acknowledgement indicator for a H-ARQ packet transmitted by the eNB 104 during a previous TDD sub-frame.

Figure 5:
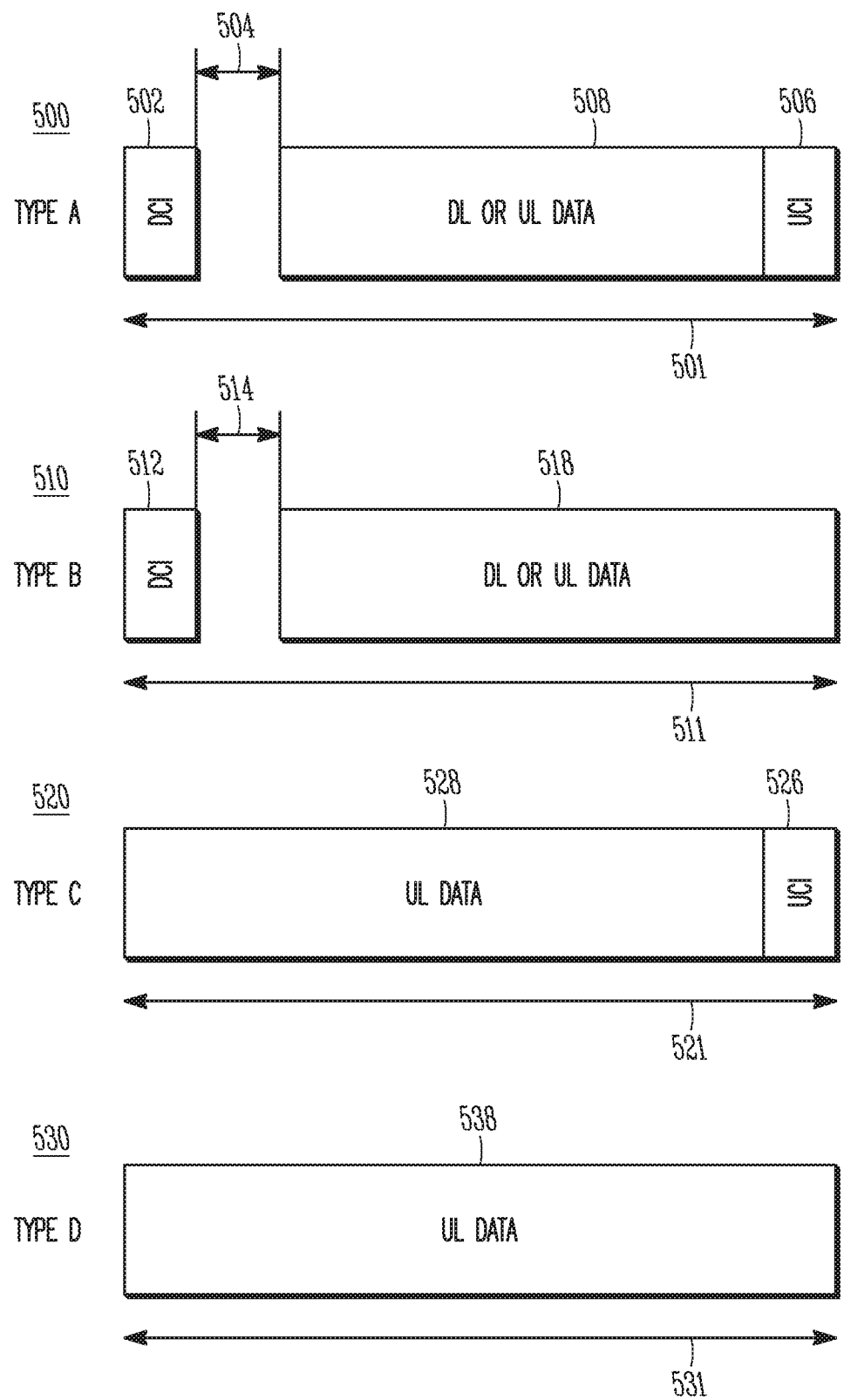
FIG. 5 illustrates example flexible duplex sub-frames in accordance with some embodiments.

FIG. 5 illustrates example flexible duplex sub-frames in accordance with some embodiments. It should be noted that although the examples flexible duplex sub-frames 500, 510, 520, 530 shown in FIG. 5 may illustrate some or all of the techniques and/or concepts described herein, embodiments are not limited by the example flexible duplex sub-frames 500, 510, 520, 530. As an example, TDD sub-frames in a group may be configured according to one or more of these example formats and/or other formats. Such configuration may be dynamic in some cases.

The example flexible duplex sub-frame 500, which may be referred to as a "Type A" sub-frame in some cases, may span a time interval 501 of one sub-frame. The example flexible duplex sub-frame 500 may include a DCI 502, a UCI 506, and a data portion 508 that may include downlink (DU and/or uplink (UL) data regions. In addition, a guard time (GT) 504 may be included between the DCI 502 and the UCI 506 in some cases. In the example flexible duplex sub-frame 500, the UCI 506 is included at the end of the sub-frame, but embodiments are not limited as such. As an example, the UCI 506 may be allocated at or near the beginning of the sub-frame in some cases. As another example, the UCI 506 may be allocated at or near the middle of the sub-frame in some cases.

The example flexible duplex sub-frame 510, which may be referred to as a "Type B" sub-frame in some cases, may span a time interval 511 of one sub-frame. The example flexible duplex sub-frame 510 may include a DCI 512 and a data portion 518 that may include downlink (DL) and/or uplink (UL) data regions. In addition, a GT 514 may be included between the DCI 512 and the data portion 518 in some cases.

The example flexible duplex sub-frame 520, which may be referred to as a "Type C" sub-frame in some cases, may span a time interval 521 of one sub-frame. The example flexible duplex sub-frame 520 may include a UCI 526 and a data portion 528 that may include an uplink (UL) data region. In the example flexible duplex sub-frame 520, the UCI 526 is included at the end of the sub-frame, but embodiments are not limited as such. As an example, the UCI 526 may be allocated at or near the beginning of the sub-frame in some cases. As another example, the UCI 526 may be allocated at or near the middle of the sub-frame in some cases.

The example flexible duplex sub-frame 530, which may be referred to as a "Type D" sub-frame in some cases, may span a time interval 531 of one sub-frame. The example flexible duplex sub-frame 530 may include a data portion 538 that may include an uplink (UL) data region.

Accordingly, it should be noted that the various examples of flexible duplex sub-frames shown in FIG. 5 may include or exclude DCIs, UCIs, and guard times (GTS), and may be configured for DL and/or UL data transmission. These examples are not limiting, however, as other arrangements may be used, in which DCIS, UCIs, and GTs may be included or excluded and in which data regions may be configured for either DL or UL data transmission or both. In addition, some flexible duplex sub-frames may include other regions in addition to, or instead of, the regions shown in FIG. 5.

As an example, a DCI may be included in or may be transmitted as part of a 5G physical downlink control channel (xPDCCH). As another example, a UCI may be included in or may be transmitted as part of a 5G physical uplink control channel (xPUCCH). As another example, downlink data may be included in or may be transmitted as part of a 5G physical downlink shared channel (xPDSCH). As another example, uplink data may be included in or may be transmitted as part of a 5G physical uplink shared channel (xPUSCH). Embodiments are not limited to these examples, however, as other channels and/or techniques may be used for the control data and other data.

In some embodiments, a group of one or more TDD sub-frames may be used, such as in a sequence or otherwise. In some cases, the TDD sub-frames may be configured according to the same flexible duplex format or may be configured according to different flexible duplex formats. As an example, a pattern of formats may be used for a sequence of TDD sub-frames in some cases.

Figure 6:
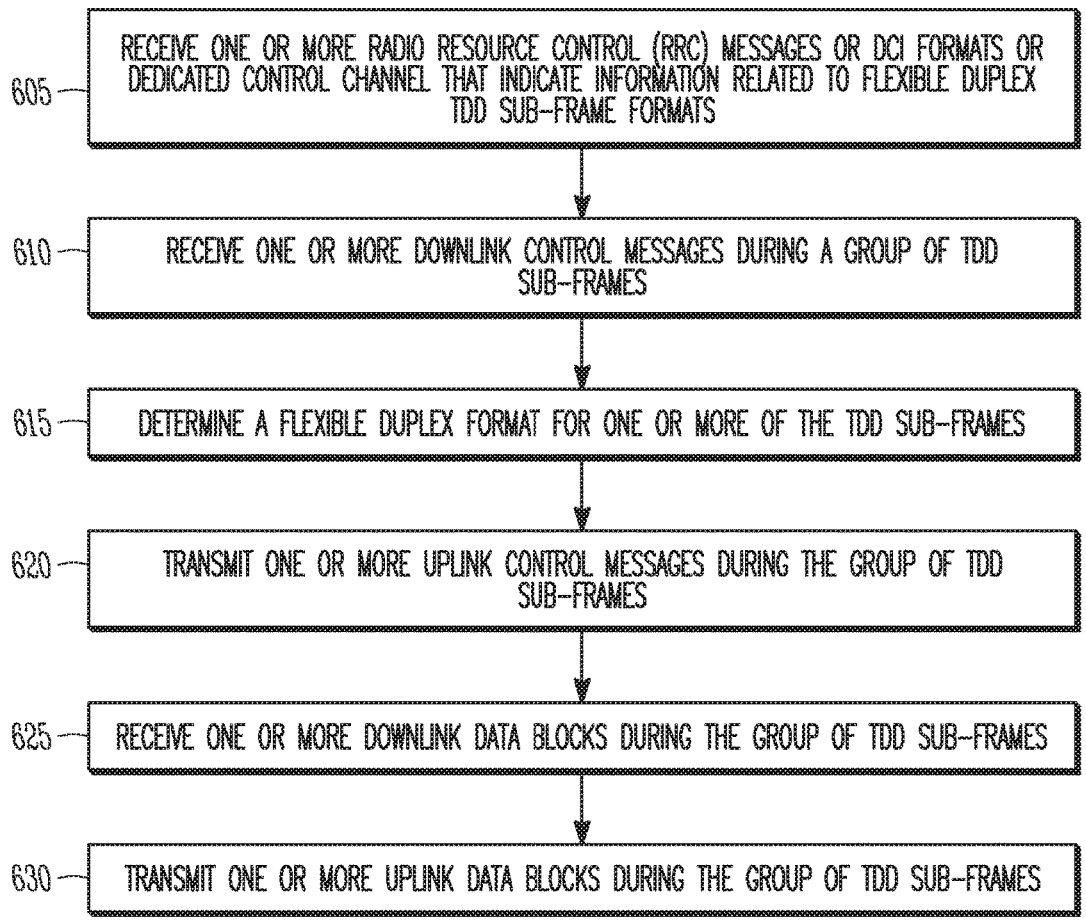
FIG. 6 illustrates the operation of another method of flexible duplex communication in accordance with some embodiments.

FIG. 6 illustrates the operation of another method of flexible duplex communication in accordance with some embodiments. As mentioned previously regarding the method 400, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5 and 7, although it is understood that the method 600 may be practiced with any other suitable systems, interfaces and components. In addition, embodiments of the method 600 may refer to UEs 102, eNBs 104, APs, STAB or other wireless or mobile devices. The method 600 may also refer to an apparatus for an eNB 104 and/or UE 102 or other device described above.

It should be noted that the method 600 may be practiced at a UE 102 and may include exchanging of signals or messages with an eNB 104. Similarly, the method 400 may be practiced at an eNB 104 and may include exchanging of signals or messages with the. UE 102. In some cases, operations and techniques described as part of the method 400 may be relevant to the method 600. In addition, embodiments may include operations performed at the UE 102 that are reciprocal or similar to other operations described herein performed at the eNB 104. For instance, an operation of the method 600 may include reception of a data block by the UE 102 while an operation of the method 400 may include transmission of the same data block or similar data block by the eNB 104. In addition, previous discussion of various techniques and concepts may be applicable to the method 600 in some cases, including TDD sub-frames, RRC messages, flexible duplex formats, DCI, UCI, data blocks, DCI formats, dedicated control channel messages and others.

At operation 605, the UE 102 may receive one or more RRC messages or dedicated control channel messages or DCIs using suitable DCI formats as described previously that may include and/or indicate information related to flexible duplex formats to be used for a group of TDD sub-frames in which the eNB 104 and the UEs 102 may communicate. Although embodiments are not limited as such, the RRC messages may be similar to RRC messages transmitted by the eNB 104 at operation 405.

At operation 610, the UE 102 may receive one or more downlink control messages during the group of TDD sub-frames. That is, during at least one of the TDD sub-frames, the UE 102 may receive a downlink control message. Although not limited as such, the downlink control messages may include one or more DCIs. At operation 615, the UE 102 may determine, based at least partly on the received downlink control messages (or DCIs), one or more flexible duplex formats that are to be used for the TDD sub-frames in the group. As an example, a DCI in a particular TDD sub-frame may indicate the flexible duplex format for the particular TDD sub-frame. As another example, a DCI in a particular TDD sub-frame may indicate the flexible duplex format for multiple TDD sub-frames that may include the particular TDD sub-frame.

At operation 620, the UE 102 may transmit one or more uplink control messages to the eNB 104. As a non-limiting example, the uplink control messages may include one or more UCIs. At operation 625, the UE 102 may receive one or more downlink data blocks from the eNB 104. At operation 630, the UE 102 may transmit one or more uplink data blocks to the eNB 104.

In some embodiments, the xPDCCH and/or the xPUCCH may be allocated for a first portion (chronologically) of the sub-frame, such as in a first one or more OFDM symbol periods of the sub-frame. The xPDSCH and/or xPUSCH may be allocated in the remaining portion of the sub-frame. These embodiments are not limiting, however, as other ordering of such channels and/or regions may be used in some cases. For instance, the xPUCCH may be allocated at the end (chronologically) of the sub-frame.

As an example, the guard time (GT) may be used to incorporate a switching time from xPDCCH reception to xPUCCH transmission for a UE 102. The GT may also accommodate a maximum timing advance for the UE 102. In some cases, no additional GT between xPUSCH and xPDCCH may be needed. As another example, the GT between xPUCCH and a flexible data region may be present if the UE 102 has a valid DL grant for the flexible data region. The UE 102 may not need to switch between xPUCCH transmission and xPDSCH reception in some cases.

In some embodiments, decoding for the UE 102 may be reduced in terms of complexity and/or power consumption if a type of flexible duplex sub-frame and/or DL control region size and/or UL control region size are indicated. For instance, such information may be included in a DCI.

In some embodiments, a type of flexible duplex sub-frame and/or DL control region sizes and/or UL control region size may be predefined or may be signaled semi-statically (by the eNB 104) via higher layer signaling. For instance, a 5G master information block (xMIB), 5G system information block (xSIB), dedicated RRC signaling and/or a new MAC Control Element (CE) may be used. In some cases, such information may be signaled from a primary cell (PCell) or from a serving cell. As an example, an overall control rethon size or total control region size may include DL and UI, control region sizes, in some cases, and may be signaled via RRC signaling from the PCell or otherwise.

In some embodiments, a transmission periodicity of the sub-frame type may be fixed in a specification in some cases. As another example, the transmission periodicity may be configurable by higher layer signaling, such as RRC signaling or other. In some cases, if the UE 102 does not detect such signaling, the UE 102 may assume that a default type (such as Type A shown in FIG. 5) may be applied. As an example, upon detection of DL control channel with an UL grant DCI format in sub-frame n intended for the UE 102, the UE 102 may adjust the corresponding xPUSCH transmission in the same or a predefined subsequent subframe n+k (with k>=0) according to either a default sub-frame type (such as type A in FIG. 5) or a detected sub-frame type. Furthermore, if an xPDSCH without the information of flexible duplex sub-frame type is scheduled for the UE 102, it may blindly decode the data under different hypotheses, such as between type A and type B sub-frame formats (FIG. 5).

As an example, the decoded sub-frame type may be reported by the UE 102 in channel state information (CSI). Accordingly, the eNB 104 may determine whether the UE 102 has decoded the control signaling correctly. When the UE 102 does not decode the control signaling correctly, it may report the CSI containing type A as a default, for instance.

In some embodiments, a type of flexible duplex sub-frame and/or DL control region size and/or UL control region size may be signaled explicitly or implicitly in the DCI format for a DL assignment or UL grant. As an example, the DCI format may include a starting symbol of an xPDSCH or xPUSCH transmission within a sub-frame. After successful decoding of the DCI format, the UE 102 may determine the starting symbol.

In some embodiments, the UE 102 may determine the type of flexible duplex sub-frame using any or all of the following operations and/or other operations. The UE 102 may monitor DL control channels either in every sub-frame or in a set of predefined sub-frames, unless the UE 102 has been assigned to transmit in the uplink. For instance, a Type C or Type D sub-frame format (see FIG. 5) may be used or a sounding reference signal (SRS) may be transmitted. As an example, a UCI transmitted by the UE 102 may include any or all of DL HARQ-ACK, beam-specific report, CSI reports or other information, which may be included in the PUSCH in a jointly-coded or separately-coded manner. Such information may also be mapped to predefined time and/or frequency resources in some cases.

The eNB 104 may signal physical resource blocks (PRBs) and/or other channel resources using any or all of the following operations and/or other operations. In a first method, the PRBs to be used for transmission of DL control information may be semi-statically configured per UE 102 via higher layer signaling. The UE 102 may blindly monitor a set of candidates defined in terms of a search space. As an example, the control channel may be limited, in time, to the first X OFDM symbols of a sub-frame.

In a second method (which may enable a reduction of power consumption by the UE 102 in some cases), a joint DCI format containing the scheduling information for future sub-frame(s) (such as DL sub-frame or multiple UL sub-frames) may be separately encoded from DL-SCH bits and transmitted in the scheduled xPDSCH resources with separate resource element (RE) mapping. The Modulation and Coding Scheme (MCS) of this DCI format may be different from an MCS for DL-SCH bits transmitted in the same PRBs. The MCS may be semi-statically configured by higher layer signaling based on UE 102 geometry. For example, a higher modulation scheme (such as 16QAM) may be UE-specific configured for DCI transmission by the eNB 104 to minimize signaling overhead. On the other hand, it is also feasible that the MCS of the DCI may be fixed in a specification. For instance, QPSK with a 1/3 code rate may be used to simplify a design. In addition, the encoded bits may be mapped to resources commonly known between eNB 104 and the UE 102, which may be similar to piggy-backing (or transporting) of a UCI on PUSCH in an LTE system. Hence, the blind detection efforts by the UE 102 may be reduced to some extent, in some cases. It should be noted that this joint DCI may include scheduling information for both downlink assignment and uplink grant for one UE 102. To enable more flexible scheduling, the gap between xPDCCH and xPDSCH/xPUSCH may be indicated in the DCI format. For instance, when xPDSCH on sub-frame n+k is scheduled by xPDCCH on subframe n, the gap k may be indicated in the DCI format.

In some embodiments, an information element (IE) may be included as part of DCI formats used for DL grant to indicate information such as an UL control channel indicator that may include a predetermined and/or predefined number of bits, X bits. This information may indicate the presence of an UL control channel in some cases. To minimize the control signaling overhead, the value of X can be limited to be one bit. Then, the value "0" may indicate no UL control channel while a value of "1" may indicate the presence of this UL channel. In this design, it is assumed that the number of OFDM symbols for UL control channel may be either predefined or semi-statically configured by higher-layer signals without the need of dynamic signaling. In addition, xPUCCH resources may be self-contained and transmitted in the same PRB numbers as the detected xPDSCH in the frequency domain. Further, a dynamic indication of other relevant information, such as PRB numbers, the numbers of OFDM symbols of UL control channel for a given UE or other information may also be used.

In some embodiments, an additional IE may be included in the DCI format for an UL grant. The IE may include a DL control channel indicator that may include a number of bits, Y bits. This information may indicate the presence of the DL control channel. Note that it may be assumed that a time division multiplexing (TDM) scheme is used for the DL control channel and PUSCH transmission. As an example, following a given UL scheduling timing, the DL control channel in sub-frame n may still be needed to schedule later sub-frame (such as n+4) for PUSCH transmission even when there is no xPDSCH transmission in sub-frame n. In this case, the UE 102 may need to know which UL sub-frame structure (flexible duplex format) is used for the PUSCH transmission. As an example, such information may be used for a rate-matching operation.

In some embodiments, the type of flexible duplex sub-frames and/or the DL/UL control region size may be indicated by a dedicated physical channel in the DL. Given that limited information can be carried in the dedicated physical channel in some cases, the size of the UL and DL configuration information may be small. In one option, the existing Physical Control Format Indicator Channel (PCFICH) as defined in the LTE specification may be reused to indicate the DL and UL configuration within a flexible duplex sub-frame. Note that in this option, two bits of information may be carried by the PCFICH.

As an example, the PTCICH may be transmitted in the first symbol within a flexible duplex sub-frame or within a predefined symbol. For instance, the second symbol may be used for PTCICH transmission and the first symbol may be dedicated for Reference signal transmission and TDM between RS and PTCICH. As an example, the PTCICH may be equally spread in 4 sub-bands, wherein each sub-band may occupy one PRB. Note that for this resource mapping scheme, spatial division multiplexing (SDM) scheme may be used to multiplex multiple UEs 102 for the transmission of the PTCICH. Given that the number of UEs 102 that receive the xPDCCH and transmit the xPUCCH may be limited within one sub-frame, the eNB 104 may transmit the PTCICH in a multiple-user multiple-input and multiple-output (MU-MIMO) fashion by using different Tx beamforming weights. It should be noted that the dedicated physical channel may not be transmitted in the case when only UL transmission is scheduled in one sub-frame. When the UE 102 does not detect the PTCICH in one sub-frame, it may determine and/or may know that the sub-frame is either an UL sub-frame or, alternatively, that the PTCICH indicates that the UE 102 may sleep for the next remaining OFDM symbols in the sub-frame (DRX).

FIG. 7 illustrates example mappings for flexible duplex formats in accordance with some embodiments. In some embodiments, a type of flexible duplex sub-frames and/or the DL/UL control region size may be indicated by a combination of the aforementioned mechanisms. In one example, dedicated RRC signaling may be used to indicate the overall control region size. For instance, three symbols may be used for the transmission of xPDCCH and/or xPUCCH. Furthermore, the dedicated physical channel may be used to indicate the symbol length for the xPDCCH and/or xPUCCH. As an example, the number of bits carried by the dedicated physical channel may be two, as can be seen in the example mapping 710. Note that other configuration information can be straightforwardly extended from the example as shown below As another example, it may be assumed that xPUCCH resources, which may include a number of OFDM symbols, is either fixed in a specification (such as two symbols if present) or may be semi-statically configurable by higher layer signaling without the need for dynamically signaling using DCI formats. Also, the physical resources blocks (PRBs) may be identical with the detected xPDSCH in some cases. As shown in the example mapping 720, an information field of two bits may be included in the DCI format, and may indicate a combination of a presence (or absence) of an UL control channel and a number of OFDM symbols for xPDCCH transmission.

As another example, a DCI for DL assignment and UL grant may be used to explicitly signal starting symbols for the transmission of the xPDSCH and/or xPUSCH. Furthermore, a type of flexible duplex sub-frame may be indicated by the dedicated physical channel. As shown in the example mapping 730, an indication of a flexible duplex sub-frame type may be mapped to a number of bits. In this example, the number of bits carried by the dedicated physical channel is two. It should be noted that other configuration information may be straightforwardly extended from the example.

As another example, one or more flexible duplex sub-frame types may be indicated per frame level using any number of techniques, including xPDCCH, EPDCCH or xPDCCH transmission or dedicated RRC signaling. In addition, a combination of such techniques may be used from one serving cell (primary cell or PCell) in an anchor booster scenario. That is, an LTE cell, 5G cell or other cell may serve as an anchor/coverage cell and a cmWave cell or a mmWave cell may serve as a booster cell. For instance, a bitmap may be used to indicate the type of flexible duplex sub-frames in one or more sub-frames within one radio frame.

Figure 8:
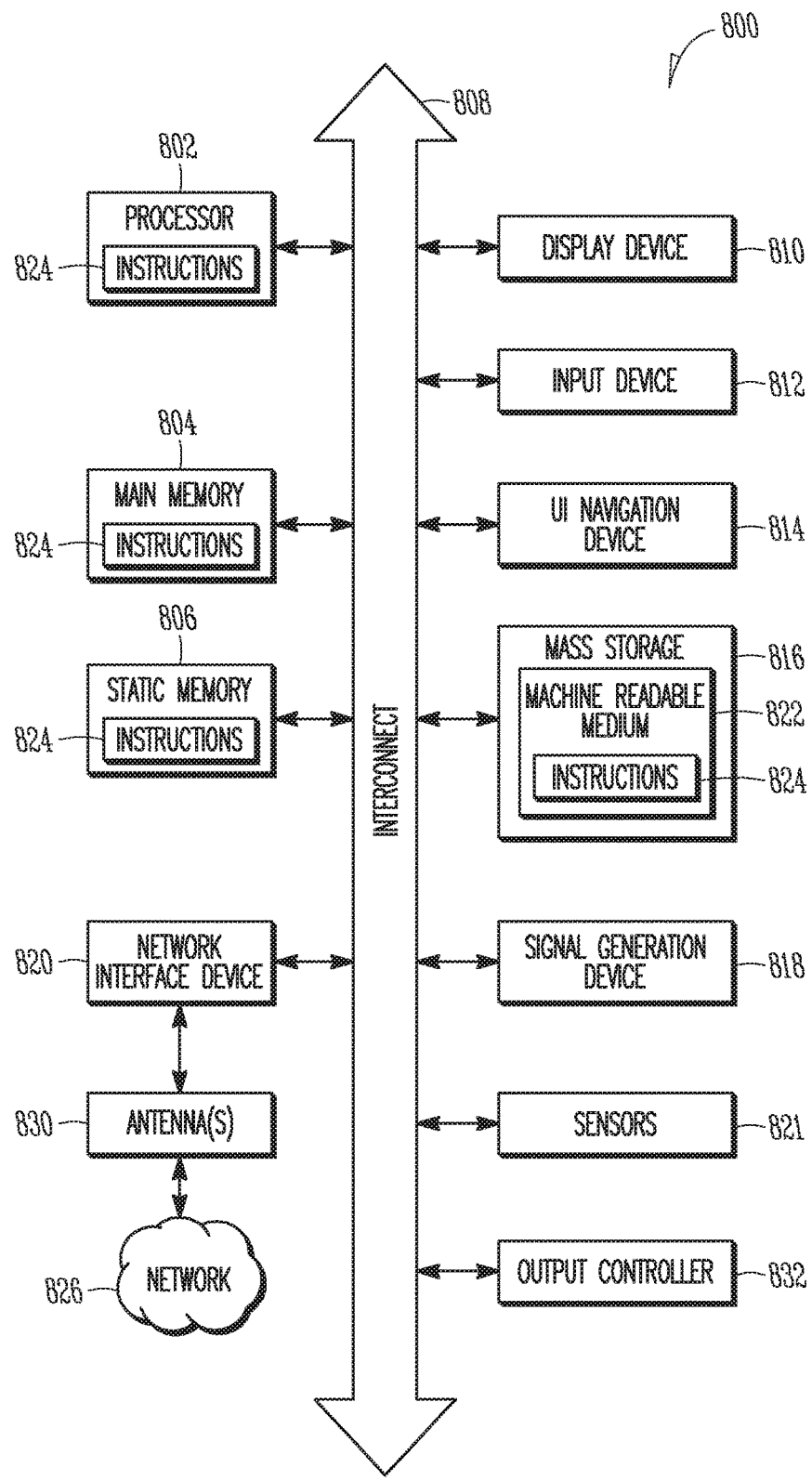
FIG. 8 illustrates a block diagram of an example machine in accordance with some embodiments.

FIG. 8 illustrates a block diagram of an example machine in accordance with some embodiments. The machine 800 is an example machine upon which any one or more of the techniques and/or methodologies discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a UE 102, eNB 104, access point (AP), station (STA), mobile device, base station, personal computer (PC), a tablet PC, a set-top box (SIB), a personal digital assistant (PDA), a mobile telephone, a smart phone, a web appliance, a network router, switch or bridge, or any machine capable of executing instructions (sequential or otherwise) that specify actions to be taken by that machine. It should be noted that in some embodiments, an eNB or other base station may include some or all of the components shown in either FIG. 3 or FIG. 8 or both. It should be noted that in some embodiments, a UE or other mobile device may include some or all of the components shown in either FIG. 2 or FIG. 8 or both. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or watt respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media. In some embodiments, the machine readable medium may be or may include a non-transitory computer-readable storage medium.

While the machine readable medium 822 is illustrated as a single medium, the term "machine readable medium" may include a single medium or multiple media (e.g., a centralized or distributed database, and/or associated caches and servers) configured to store the one or more instructions 824. The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM), and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

In Example 1, an apparatus for an Evolved Node-B (eNB) may comprise transceiver circuitry and hardware processing circuitry. The hardware processing circuitry may configure the transceiver circuitry to transmit a downlink control information (DCI) block to a User Equipment (UE) during a group of time-division duplex (TDD) sub-frames. The hardware processing circuitry may further configure the transceiver circuitry to receive an uplink control information (DCI) block from the UE during the group of TDD sub-frames. The TDD sub-frames in the group may be configured according to one or more candidate flexible duplex formats. A first candidate flexible duplex format may include a downlink control portion allocated for DCI transmission by the eNB and may further include an uplink control portion allocated for UCI transmission by the UEs. A second candidate flexible duplex format may include a downlink control portion allocated for DCI transmission by the eNB and may exclude uplink control portions allocated for UCI transmission by the UEs.

In Example 2, the subject matter of Example 1, wherein the first and second candidate flexible duplex formats may further include data portions allocated for downlink data transmissions by the eNB and/or uplink data transmissions by the UE.

In Example 3, the subject matter of one or any combination of Examples 1-2, wherein the DCI block may indicate time resources to be used for data transmissions during one of the TDD sub-frames in the group.

In Example 4, the subject matter of one or any combination of Examples 1-3, wherein at least one of the TDD sub-frames in the group may be configured according to the first candidate flexible duplex format and at least one of the TDD sub-frames in the group may be configured according to the second candidate flexible duplex format.

In Example 5, the subject matter of one or any combination of Examples 1-4, wherein for at least one TDD sub-frame in the group, a DCI block transmitted during the TDD sub-frame may indicate a starting time of a data portion allocated for data transmissions during the TDD sub-frame.

In Example 6, the subject matter of one or any combination of Examples 1-5, wherein for at least one TDD sub-frame in the group, a DCI block transmitted during the TDD sub-frame may indicate a flexible duplex format for the TDD sub-frame.

In Example 7, the subject matter of one or any combination of Examples 1-6, wherein for at least one TDD sub-frame in the group, a DCI block transmitted during the TDD sub-frame may indicate whether an uplink control portion is allocated for the TDD sub-frame.

In Example 8, the subject matter of one or any combination of Examples 1-7, wherein for at least one TDD sub-frame in the group, a DCI block transmitted during the TDD sub-frame may indicate whether an uplink control portion is allocated for the TDD sub-frame and may further indicate a size of a downlink control portion allocated for the TDD sub-frame.

In Example 9, the subject matter of one or any combination of Examples 1-8, wherein for at least one TDD sub-frame in the group, a UCI block received during the TDD sub-frame may include a hybrid automatic repeat request (H-ARQ) acknowledgement indicator for a H-ARQ packet transmitted by the eNB during a previous TDD sub-frame.

In Example 10, the subject matter of one or any combination of Examples 1-9, wherein the hardware processing circuitry may further configure the transceiver circuitry to transmit one or more radio resource control (RRC) messages or dedicated control channel messages that indicate which candidate flexible duplex formats are to be used for the TDD sub-frames in the group.

In Example 11, the subject matter of one or any combination of Examples 1-10, wherein the DCI may use a DCI format for which a portion of the DCI is reserved to indicate which candidate flexible duplex formats are to be used for the TDD sub-frames in the group.

In Example 12, the subject matter of one or any combination of Examples 1-11, wherein the hardware processing circuitry may further configure the transceiver circuitry to transmit one or more radio resource control (RRC) messages or dedicated control channel messages that indicate time resources allocated for the downlink control portions and the uplink control portions of the TDD sub-frames in the group.

In Example 13, the subject matter of one or any combination of Examples 1-12, wherein the hardware processing circuitry may further configure the transceiver circuitry to transmit one or more radio resource control (RRC) messages or dedicated control channel messages that indicate frequency resources allocated for the downlink control portions and the uplink control portions of the TDD sub-frames in the group.

In Example 14, the subject matter of one or any combination of Examples 1-13, wherein for at least one of the TDD sub-frames in the group, the DCIs transmitted during the TDD sub-frame may indicate flexible duplex formats for multiple TDD sub-frames in the group.

In Example 15, the subject matter of one or any combination of Examples 1-14, wherein a third candidate flexible duplex format may exclude downlink control portions allocated for DCI transmission by the eNB and may include an uplink control portion allocated for UCI transmission by the UEs.

In Example 16, the subject matter of one or any combination of Examples 1-15, wherein the eNB may be arranged to operate according to one or more fifth generation (5G) mobile communication protocols.

In Example 17, a non-transitory computer-readable storage medium may store instructions for execution by one or more processors to perform operations for communication by an Evolved Node-B (eNB). The operations may configure the one or more processors to configure the eNB to transmit a first downlink control information (DCI) block to a first User Equipment (UE) during a first time-division duplex (TDD) sub-frame. The operations may further configure the one or more processors to configure the eNB to receive, from the first UE, an uplink control information (UCI) block during the first TDD sub-frame. The operations may further configure the one or more processors to configure the eNB to transmit a second DCI block to a second UE during a second TDD sub-frame. The first TDD sub-frame may be configured according to a first flexible duplex format that includes a downlink control portion and an uplink control portion. The second TDD sub-frame may be configured according to a second flexible duplex format that includes a downlink control portion and excludes uplink control portions.

In Example 18, the subject matter of Example 17, wherein the operations may further configure the one or more processors to configure the eNB to, in response to the DCIs transmitted during the first TDD sub-frame indicating that the first TDD sub-frame includes a downlink data portion, transmit a data block to the first UE during the downlink data portion. The operations may further configure the one or more processors to configure the eNB to, in response to the DCIs transmitted during the first TDD sub-frame indicating that the first TDD sub-frame includes an uplink data portion, receive a data block from the first UE during the uplink data portion.

In Example 19, the subject matter of one or any combination of Examples 17-18, wherein the first and second TDD sub-frames may be included in a sequence of TDD sub-frames. Each TDD sub-frame in the sequence may be configured according to a flexible duplex format selected from a group of candidate flexible duplex formats that includes the first and second flexible duplex formats.

In Example 20, the subject matter of one or any combination of Examples 17-19, wherein the group of candidate flexible duplex formats may further include a third flexible duplex format that includes an uplink control portion and excludes downlink control portions.

In Example 21, the subject matter of one or any combination of Examples 17-20, wherein the DCI blocks transmitted during the first TDD sub-frame may indicate time resources allocated during the first TDD sub-frame for downlink data transmissions by the eNB and/or uplink data transmissions by the UE.

In Example 22, an apparatus for a User Equipment (UE) may comprise transceiver circuitry and hardware processing circuitry. The hardware processing circuitry may configure the transceiver circuitry to receive one or more downlink control information (DCI) blocks from an Evolved Node-B (eNB) during a time-division duplex (TDD) sub-frame. The hardware processing circuitry may be configured to determine, based at least partly on the received DCI blocks, a flexible duplex format for the TDD sub-frame from a group of candidate flexible duplex formats. A first candidate flexible duplex format may include a downlink control portion and an uplink control portion. A second candidate flexible duplex format may include a downlink control portion and may exclude uplink control portions.

In Example 23, the subject matter of Example 22, wherein the downlink control portions may be allocated for transmission of DCI blocks by the eNB. The uplink control portion may be allocated for transmission of uplink control information (UCI) blocks by UEs.

In Example 24, the subject matter of one or any combination of Examples 22-23, wherein the hardware processing circuitry may further configure the transceiver circuitry to transmit, when the determined flexible duplex format for the TDD sub-frame includes an uplink control portion, an uplink control information (UCI) block to the eNB during the TDD sub-frame.

In Example 25, the subject matter of one or any combination of Examples 22-24, wherein the UCI may include a hybrid automatic repeat request (H-ARQ) acknowledgement indicator for a H-ARQ packet received from the eNB during a previous TDD sub-frame.

In Example 26, the subject matter of one or any combination of Examples 22-25, wherein the first and second candidate flexible duplex formats may further include data portions allocated for downlink data transmissions by the eNB and/or uplink data transmissions by the UEs.

In Example 27, the subject matter of one or any combination of Examples 22-26, wherein the hardware processing circuitry may further configure the transceiver circuitry to transmit, when the DCI blocks include an uplink grant for the UE, a data packet to the eNB in time resources indicated by the uplink grant.

In Example 28, the subject matter of one or any combination of Examples 22-27, wherein the UE may be arranged to operate according to one or more fifth generation (5G) mobile communication protocols.

In Example 29, the subject matter of one or any combination of Examples 22-28, wherein the apparatus may further include one or more antennas coupled to the transceiver circuitry for the reception of the DCI blocks.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an Evolved Node-B (eNB), the apparatus comprising transceiver circuitry and hardware processing circuitry, the hardware processing circuitry to configure the transceiver circuitry to:
   transmit a downlink control information (DCI) block to a User Equipment (UE) during a group of time-division duplex (TDD) sub-frames; and
   receive an uplink control information (UCI) block from the UE during the group of TDD sub-frames,
   wherein the TDD sub-frames in the group are configured according to one or more candidate flexible duplex formats,
   wherein a first candidate flexible duplex format includes a downlink control portion allocated for DCI transmission by the eNB and further includes an uplink control portion allocated for UCI transmission by the UEs, and
   wherein a second candidate flexible duplex format includes a downlink control portion allocated for DCI transmission by the eNB and excludes uplink control portions allocated for UCI transmission by the UEs.

2. The apparatus according to claim 1, wherein the first and second candidate flexible duplex formats further include data portions allocated for downlink data transmissions by the eNB and/or uplink data transmissions by the UE.

3. The apparatus according to claim 2, wherein the DCI block indicates time resources to be used for data transmissions during one of the TDD sub-frames in the group.

4. The apparatus according to claim 1, wherein at least one of the TDD sub-frames in the group is configured according to the first candidate flexible duplex format and at least one of the TDD sub-frames in the group is configured according to the second candidate flexible duplex format.

5. The apparatus according to claim 1, wherein for at least one TDD sub-frame in the group, a DCI block transmitted during the TDD sub-frame indicates a starting time of a data portion allocated for data transmissions during the TDD sub-frame.

6. The apparatus according to claim 1, wherein for at least one TDD sub-frame in the group, a DCI block transmitted during the TDD sub-frame indicates a flexible duplex format for the TDD sub-frame.

7. The apparatus according to claim 1, wherein for at least one TDD sub-frame in the group, a DCI block transmitted during the TDD sub-frame indicates whether an uplink control portion is allocated for the TDD sub-frame.

8. The apparatus according to claim 1, wherein for at least one TDD sub-frame in the group, a DCI block transmitted during the TDD sub-frame indicates whether an uplink control portion is allocated for the TDD sub-frame and further indicates a size of a downlink control portion allocated for the TDD sub-frame.

9. The apparatus according to claim 1, wherein for at least one TDD sub-frame in the group, a UCI block received during the TDD sub-frame includes a hybrid automatic repeat request (H-ARQ) acknowledgement indicator for a H-ARQ packet transmitted by the eNB during a previous TDD sub-frame.

10. The apparatus according to claim 1, the hardware processing circuitry to further configure the transceiver circuitry to transmit one or more radio resource control (RRC) messages or dedicated control channel messages that indicate which candidate flexible duplex formats are to be used for the TDD sub-frames in the group.

11. The apparatus according to claim 1, wherein the DCI uses a DCI format for which a portion of the DCI is reserved to indicate which candidate flexible duplex formats are to be used for the TDD sub-frames in the group.

12. The apparatus according to claim 1, the hardware processing circuitry to further configure the transceiver circuitry to transmit one or more radio resource control (RRC) messages or dedicated control channel messages that indicate time resources allocated for the downlink control portions and the uplink control portions of the TDD sub-frames in the group.

13. The apparatus according to claim 1, the hardware processing circuitry to further configure the transceiver circuitry to transmit one or more radio resource control (RRC) messages or dedicated control channel messages that indicate frequency resources allocated for the downlink control portions and the uplink control portions of the TDD sub-frames in the group.

14. The apparatus according to claim 1, wherein for at least one of the TDD sub-frames in the group, the DCIs transmitted during the TDD sub-frame indicate flexible duplex formats for multiple TDD sub-frames in the group.

15. The apparatus according to claim 1, wherein a third candidate flexible duplex format excludes downlink control portions allocated for DCI transmission by the eNB and includes an uplink control portion allocated for UCI transmission by the UEs.

16. The apparatus according to claim 1, wherein the eNB is arranged to operate according to one or more fifth generation (5G) mobile communication protocols.

17. A non-transitory computer-readable storage medium that stores instructions for execution by one or more processors to perform operations for communication by an Evolved Node-B (eNB), the operations to configure the one or more processors to configure the eNB to:
transmit a first downlink control information (DCI) block to a first User Equipment (UE) during a first time-division duplex (TDD) sub-frame;
receive, from the first UE, an uplink control information (UCI) block during the first TDD sub-frame; and
transmit a second DCI block to a second UE during a second TDD sub-frame;
wherein the first TDD sub-frame is configured according to a first flexible duplex format that includes a downlink control portion and an uplink control portion, and
wherein the second TDD sub-frame is configured according to a second flexible duplex format that includes a downlink control portion and excludes uplink control portions.

18. The non-transitory computer-readable storage medium according to claim 17, the operations to further configure the one or more processors to configure the eNB to:
in response to the DCIs transmitted during the first TDD sub-frame indicating that the first TDD sub-frame includes a downlink data portion, transmit a data block to the first UE during the downlink data portion; and
in response to the DCIs transmitted during the first TDD sub-frame indicating that the first TDD sub-frame includes an uplink data portion, receive a data block from the first UE during the uplink data portion.

19. The non-transitory computer-readable storage medium according to claim 17, wherein:
the first and second TDD sub-frames are included in a sequence of TDD sub-frames, and
each TDD sub-frame in the sequence is configured according to a flexible duplex format selected from a group of candidate flexible duplex formats that includes the first and second flexible duplex formats.

20. The non-transitory computer-readable storage medium according to claim 19, wherein the group of candidate flexible duplex formats further includes a third flexible duplex format that includes an uplink control portion and excludes downlink control portions.

21. The non-transitory computer-readable storage medium according to claim 17, wherein the DCI blocks transmitted during the first TDD sub-frame indicate time resources allocated during the first TDD sub-frame for downlink data transmissions by the eNB and/or uplink data transmissions by the UE.

22. An apparatus for a User Equipment (UE), the apparatus comprising transceiver circuitry and hardware processing circuitry, the hardware processing circuitry configured to:
configure the transceiver circuitry to receive one or more downlink control information (DCI) blocks from an Evolved Node-B (eNB) during a time-division duplex (TDD) sub-frame; and
determine, based at least partly on the received DCI blocks, a flexible duplex format for the TDD sub-frame from a group of candidate flexible duplex formats,
wherein a first candidate flexible duplex format includes a downlink control portion and an uplink control portion, and
wherein a second candidate flexible duplex format includes a downlink control portion and excludes uplink control portions.

23. The apparatus according to claim 22, wherein:
the downlink control portions are allocated for transmission of DCI blocks by the eNB, and the uplink control portion is allocated for transmission of uplink control information (UCI) blocks by UEs.

24. The apparatus according to claim 22, the hardware processing circuitry to configure the transceiver circuitry to transmit, when the determined flexible duplex format for the TDD sub-frame includes an uplink control portion, an uplink control information (UCI) block to the eNB during the TDD sub-frame.

25. The apparatus according to claim 24, wherein the UCI includes a hybrid automatic repeat request (H-ARQ) acknowledgement indicator for a H-ARQ packet received from the eNB during a previous TDD sub-frame.

26. The apparatus according to claim 22, wherein the first and second candidate flexible duplex formats further include data portions allocated for downlink data transmissions by the eNB and/or uplink data transmissions by the UEs.

27. The apparatus according to claim 22, the hardware processing circuitry to further configure the transceiver circuitry to transmit, when the DCI blocks include an uplink grant for the UE, a data packet to the eNB in time resources indicated by the uplink grant.

28. The apparatus according to claim 22, wherein the UE is arranged to operate according to one or more fifth generation (5G) mobile communication protocols.

29. The apparatus according to claim 22, wherein the apparatus further includes one or more antennas coupled to the transceiver circuitry for the reception of the DCI blocks, and wherein the transceiver circuitry and hardware processing circuitry comprise a front-end module and baseband processing circuitry.

* * * * *